United States Patent [19]

Bozzolato

[11] Patent Number: 4,669,843

[45] Date of Patent: Jun. 2, 1987

[54] ROTATABLE HELIBORNE BEAM FOR SUPPORTING METRIC PHOTO-CAMERAS SUITABLE TO INDUSTRIAL STEREOPHOTOGRAMMETRIC SURVEYS

[75] Inventor: Giovanni Bozzolato, Segrate, Italy

[73] Assignee: Agip, S.p.A., Milan, Italy

[21] Appl. No.: 806,973

[22] Filed: Dec. 9, 1985

[30] Foreign Application Priority Data

Dec. 21, 1984 [IT] Italy ................................ 24233 A/84

[51] Int. Cl.4 ............................................. G03B 39/00
[52] U.S. Cl. ........................................................ 354/74
[58] Field of Search ............... 354/74, 113; 244/118 R

[56] References Cited

U.S. PATENT DOCUMENTS

| | | | |
|---|---|---|---|
| 2,506,095 | 5/1950 | Mantz | 354/74 |
| 3,523,660 | 8/1970 | Attebery et al. | 354/74 X |
| 4,162,776 | 7/1979 | Sibley et al. | 354/74 X |
| 4,174,162 | 11/1979 | Giacomini et al. | 354/74 X |
| 4,218,702 | 8/1980 | Brocard et al. | 354/74 X |

Primary Examiner—Donald A. Griffin
Attorney, Agent, or Firm—Hedman, Gibson, Costigan & Hoare

[57] ABSTRACT

Heliborne beam for supporting at its two ends metric photocameras suitable to industrial stereophotogrammetric surveys, constituted by a plurality of cylindrical tubular sections linked in sequence with each other by means of flanges, and supported manually rotatable, but not longitudinally sliding with their center section inserted inside three clamp collars mounted, through double-effect cylindrical shock absorbers, on a base or bench fastened on to the floor of helicopter's cabin; at the end of the beam, two cylindrical housings with aerodynamic closure elements and provided with "eyelid" door, inside which the photocameras are supported by means of a frame linked to the housing by means of two respectively radial and axial shock absorbing units, and provided with two inner guides into which the side supporting pins of the said photocamera are inserted.

4 Claims, 14 Drawing Figures

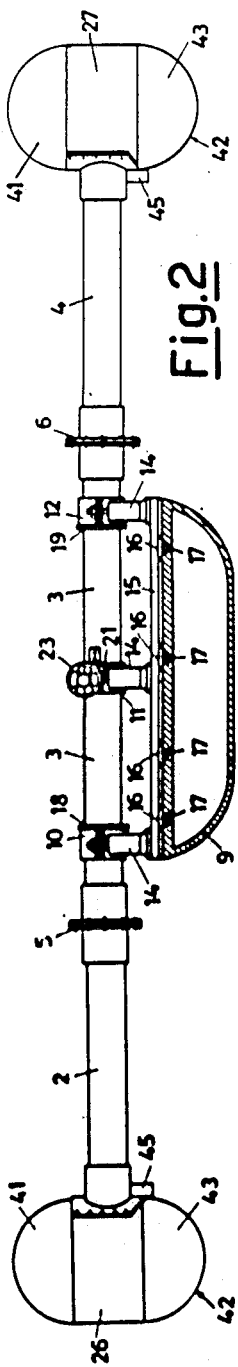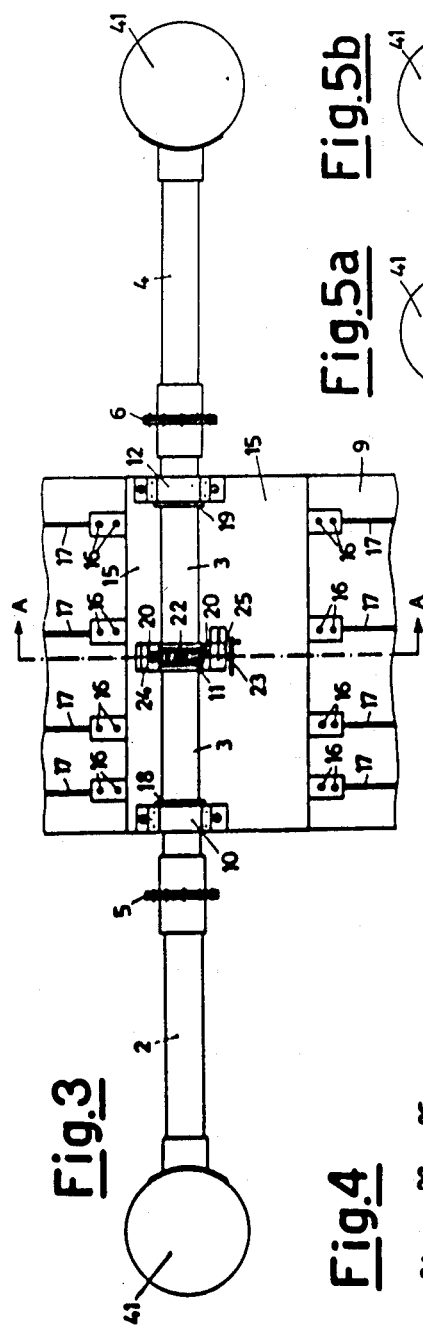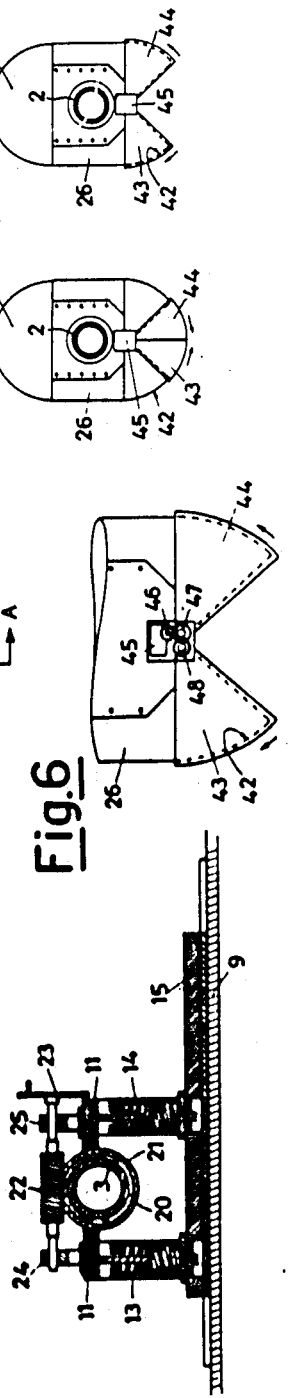

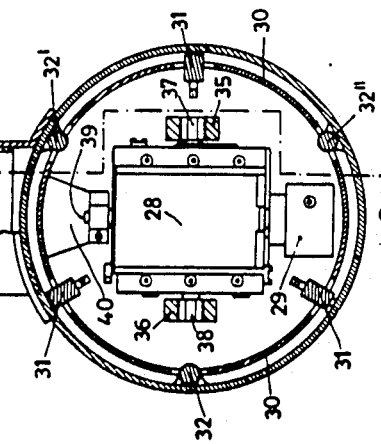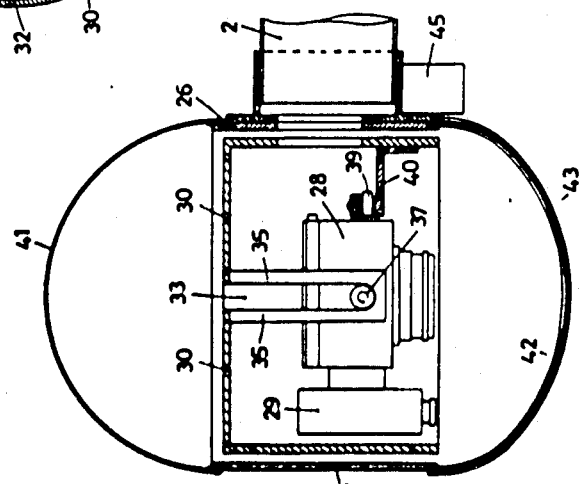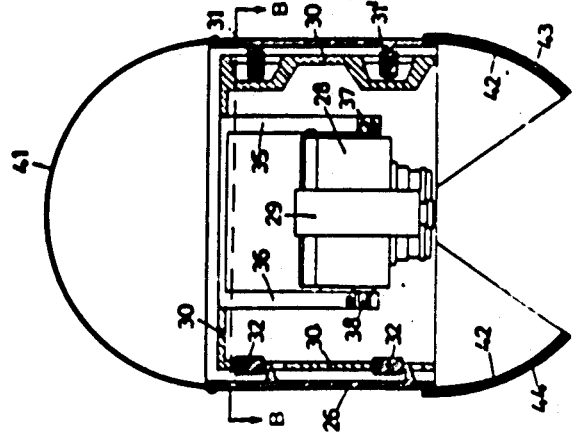

ROTATABLE HELIBORNE BEAM FOR SUPPORTING METRIC PHOTO-CAMERAS SUITABLE TO INDUSTRIAL STEREOPHOTOGRAMMETRIC SURVEYS

The present invention relates to a novel type of heliborne beam which, by being rotary, easily transportable, and easily installable on board of any medium-large helicopter, although it has a considerable weight, and by being moreover capable to eliminate the vibrations generated by the same helicopter, makes easier, quicker and cheaper the obtaining of perfect stereoscopic images of an object being examined, rendering possible an efficacious and precise stereophotogrammetric survey of industrial type of the same object.

It is known that the increasing demand, in particular in the field of off-shore constructions, for verifying the dimensions, and surveying large constructions, in the state "as built", of any complexity and not easily accessible, has promoted a considerable improvement of stereophotogrammetry, which has led to a novel improved stereophotogrammetric survey of large-size objects offshore or on land, such as disclosed in the U.S. patent application Ser. No. 615,839 filed on May 31,1984.

For the application of such a method, stereoscopic pictures are necessary of the object to be analyzed, which are prepared from pairs of pictures obtained by means of metric photocameras synchronized and mounted in an orientatable way at the two ends of a rigid beam cantilevering from the two sliding doors of a helicopter.

From the present art, photocameras supporting beams for taking stereo pictures from helicopters are already known, but said known beams are just simple short and light trusses, only suitable to support normal small size and low weight photocameras for surveys wherein a high precision is not required, e.g., in the forest field, and are hence unsuitable for industrial applications.

In fact, in the field of industrial stereophotogrammetry, complete and precise pictures must be accomplished of constructions whose minimum dimensions are ususally around 20–30 m, and hence elementary perspective considerations require that photocameras should be positioned at a minimum distance of 30 m from the same construction, that involves that the distance between the centres of cameras' objectives be of 6 meters minimum, optimum distance to achieve the accuracy requires in the depth measurement with the stereoplotter.

As the solution of using two photocameras synchronized and positioned inside suitably provided scuttles, at a distance of 6 m from each other, respectively at the front end and at the rear end of the helicopter has been decidedly rejected, in that it would involve very notable disadvantages, among which the most evident are troubles in helicopter's functionality, as well as a weakening of its structure, high helicopter adaptation costs, and lack of elasticity of the solution, which implies having to depend on one helicopter suitably modified to carry out surveys in different world's parts, with consequent high craft's travelling costs, it derives therefrom that the two photocameras are to be installed at the ends of a beam at least 6 meters long, cantilevering out of the sliding doors of the helicopter and perpendicularly to the axis of the same helicopter, beam which involves hence serious problems of overall dimensions and consequently of transportation, as well as of installation on helicopter's board, in order not to alter the functionality thereof.

On the other hand, as the stereophotogrammetric survey the more precise, the more neat and good the pictures taken, it follows that in the industrial field synchronized metric photocameras must be used, which are precise, but also big and heavy, that involves that said beam, besides being cumbersome, must also have a large weight, to be rigid enough to cantilever-support the said heavy metric photocameras at its ends, with consequent worsening of the said drawbacks. Finally, it is clear that the structure must be so arranged, as to avoid that helicopter's vibrations are not transmitted to the photocameras, and hence to the same beam, which hence cannot be fastened to the helicopter directly; but through a suitable complex system of shock absorbers suitable to absorb vibrations in whatsoever direction.

Purpose of the present invention is precisely to solve the said problems, and hence to provide a heliborne beam for industrial use, capable of housing at its end two metric photocameras with distance between objectives' centres of the order of 6 m, which is practically insensible to any helicopter's vibrations, is easily transportable and quickly installable on board of any medium-large size helicopter, and is moreover rotatable to allow taking pictures both of nadiral or vertical type, and of horizontal or panoramic type with any inclinations.

Such purpose is substantially achieved by adopting as beam a cylindrical tubular structure very rigid and of large weight, constituted by a plurality of (generally three) sections, linked in sequence to each other by means of flanges of large dimensions to increase the stiffness degree of the same beam, said structure being cantilevering from the two helicopter's sides perpendicularly to the axis of the same helicopter and being mounted with its centre section, in a way cushioned and insensible to vibrations, on a base or bench which, while being laid on the floor of helicopter's cabine, is made rigidly solid with the helicopter by means of a consistent amount of rag bolts or nut-bolts fastened on to the same guides usually serving to fasten the seats.

In such a way indeed the beam can be easily and quickly installed on board of any medium-large size helicopter, passing through the cabin of the same helicopter, without imposing structural modifications of this latter and, by being, notwithstanding its length of 6 meters, quickly sectionable in a plurality of parts, can be easily transported by air freight too, after having been housed inside suitable containers. Moreover, its circular section makes it possible to make the beam come out of helicopter's cabin through matching semicircular ports provided in the two swings of the vehicle's side doors, without jeopardizing the regular opening and closure of the same swings, that allows the full functionality of the helicopter, with evident advantages of safety and physical comfort for operating staff, who can operate while flying without being exposed to cold and wind.

Said centre section of the tubular beam is then mounted on the base in a way cushioned and insensible to helicopter's vibrations by means of three clamp collars which support it and are supported, in their turn, each one by two double-effect cylindrical shock absorbers, of column shape, fastened on to the base on opposite sides relatively to the longitudinal axis of the same section. On the other side, the two side collars act also as thrust blocks, by cooperating with two corresponding shoulder washers, in that, besides supporting the weight of the beam, they discharge also possible thrusts produced by said washers when helicopter's rolling or temporary transversal inclination occur. The centre collar's purpose, on the contrary, is not only to support the beam, but above all, of rendering the beam rotation control unit independent from the vibrations induced on the base by helicopter's rotor. By such a structure indeed, the cylindrical tubular beam not only results insulated from possible vibrations, but can also rotate around its longitudinal axis, but without longitudinally sliding, due to the presence of the said two shoulder washers, that allows taking pictures both of nadiral and of horizontal type, as well as of panoramic types, according to needs, by considering the structure of the construction to photographed, the position from where it is better visible, and finally the possibilities of approach and of flying over by the helicopter, by rotating the beam is such a way that the axes of the metric photocameras fastened at the ends of the same beams may be aimed respectively downwards, horizontally forward into flying direction, or towards intermediate inclined directions.

To that purpose, said centre collar is partly split in two parts, to create a circumferential slot through which a rack fastened on to the outer circumference of the centre section of the beam can protrude, said rack inmeshing with a worm provided with handwheel for the manual rotation by 180° of the beam around its own longitudinal axis, in its turn rotatably supported on said centre collar.

In such a way indeed the device for beam rotation results constrained to the centre section, but not to the base, and can hence be influenced by helicopter's vibrations to a minimum extent only.

The two metric photocameras are then mounted on to the ends of said cylindrical tubular beam, about 6 meters long, within suitable cylindrical housings which, by being solid with the beam, rotate with this latter and can hence be orientated according to the flight direction, or according to the photogrammetric survey requirements. Each cylindrical housing is then completed by aerodynamic closure elements, of hemispheric or ovoidal shape, to better beat air resistance, one of which is stationary and destined to be placed forward during the transfer flight, and the other one, which is positioned rearwards during said transfer flight, is partly movable with doors of the so-called "eyelid" type, which carry out a protective function, in that they are normally kept closed during the take-off, transfer flight and landing stages, so as to prevent that dust, splashes or the like may damage the instruments, whilst are opened only during the relatively short periods of picture taking.

The opening and the closing of each door is obtained by means of a small electrical motor actuating two gear wheels inmeshing with each other, and respectively solid with the two door's eyelids, said small motor being turned on by the operator in cabin, according to a well known and reliable aeronautical solution.

On the other hand, due to the inaccessibility of the photogrammetric equipment on flight, in that the photocameras are about 2 meters outside the cabin, two control systems are to be adopted, one of telecontrol and the other one for remote check, to orientate and aim with precision the metric photocameras, and the related telecontrol devices and check monitors are installed on said base or bench inside the helicopter's cabin.

To the purpose finally to guarantee the absorption of even the minimum residual vibrations, not compensated for by said three clamp-collars shock absorbing system, whichever the trim of photocameras, and i.e. their rotation angle relatively to horizontal axis, may be, each photocamera is mounted, together with its related telecamera for the aiming check, inside its respective cylindrical housing through a support cylindrical frame, in two inner guides provided in opposite brackets of which the lateral photocamera's support pins are inserted, said frame being linked to the outer housing by means of two shock absorber units, the first unit being constituted by two superimposed threes of double-effect shock absorbers positioned in radial direction, and equally spaced apart from each other by 120° C., whilst the second unit is constituted by three coaxial pairs of shock absorbers, of double-effect type as well, positioned according to the generatrices of the cylindrical frame, and i.e., perpendicularly to the foregoing, equally spaced apart from each other by 120° C., and staggered relatively to the shock absorbers of the first unit.

By this solution indeed, whether photocameras trim is sub-horizontal, as it occurs during the transfer flights or during the horizontal picture taking, or it is subvertical, as it occurs in the nadiral picture taking, the vibrations shall be surely absorbed by the action of said shock absorbing units.

Summarizing, the heliborne beam, about 6 meters long, for supporting at its two ends two metric photocameras suitable to industrial stereophotogrammetric surveys, said beam being cantilevering from the two sides of a helicopter, perpendicularly to the axis of the same helicopter, is characterized according to the present invention in that it is constituted by a cylindrical tubular structure very rigid and of considerable weight, formed by a plurality of sections linked in sequence with each other by means of large-dimension flanges, of which the centre section is rotatably supported by three clamp-collars each supported by two double-effect cylindrical shock absorbers, of column shape, fastened on opposite sides relatively to the longitudinal axis of the same section on a base or bench which is bolted on to the helicopter cabin's floor by means of nut-bolts fastened to the same guides usually used for fastening the seats, the two side collars of the three being in shoulder cooperation with two corresponding shoulder washers fastened on to the said centre section, whilst the centre collar is partly split into two parts, to create a circumferential slot through which a rack fastened on to the outer circumference of said beam's center section extends, said rack inmeshing with a worm provided with handwheel for the manual turning by 180° of the beam around its own longitudinal axis, which is rotatably supported on said centre collar, means being moreover provided to support the metric photocameras provided with respective telecamera for the aiming check, in a way cushioned and insensible to vibrations, inside cylindrical housings solid with the beam ends, each cylindrical housing being completed by aerodynamic closures of hemispherical or ovoidal shape, of which one is stationary in the portion which is positioned forward during the transfer flight, and one is partly movable with doors of the "eyelid" type, actuated by a small electrical motor acting on two gear wheels inmeshing with each other, and respectively solid with the two door's eyelids, and means being moreover provided for the telecontrol and the remote check of said photocameras, the control devices and the check monitors being installed on said base or bench inside the helicopter's cabin.

According then to another characteristic of the present invention, the said means for supporting the metric photocameras provided with respective telecamera for the aiming check in a way cushioned and insensible to the vibrations within cylindrical housings solid with the beam's ends consist in a support cylindrical frame into two inner guides provided in two opposite brackets of which the photocamera support side pins are inserted, said frame being linked to its respective outer housing by means of two shock absorber units, the first unit being constituted by two superimposed threes of double-effect shock absorbers positioned in radial direction, and equally spaced apart from each other by 120°, whilst the second unit is constituted by three coaxial pairs of shock absorbers, they too of double-effect type, positioned according to the generatrices of the cylindrical frame, and i.e. perpendicularly to the foregoing, equally spaced apart from each other by 120° and staggered relatively to the shock absorbers of the first unit.

According a preferred embodiment of the present invention, the said tubular cylindrical structure is on the contrary formed by three equal sections linked in sequence.

According to finally a further preferred embodiment of the present invention, the said beam cantilevers from the two helicopter's sides through matching semicircular ports open in the two swings of the helicopter cabin side doors.

The invention is now better clarified with reference to the attached drawings, illustrating a preferred practical embodiment, given to only exemplifying, but not limitative purpose, in that it shall always be possible to introduce technical or constructional variants without going out of the limits of the present invention.

In said drawings

FIG. 2 shows a front view of the beam of FIG. 1;

FIG. 3 shows a top view of the beam of FIG. 2;

FIG. 4 shows a cross section made according to the path AA of FIG. 3;

FIGS. 5a and 5b show a side view of the detail of a housing of the beam of FIG. 1, respectively with the doors closed and open;

FIG. 6 shows a view partial and on enlarged scale of FIG. 5b, wherein the door actuating gear wheels are evidenced;

FIG. 7 shows a side cross view on a very enlarged scale of a housing of the beam of FIG. 1;

FIG. 8 shows a top sectional view made according to the path BB of FIG. 7;

FIG. 9 shows a front section view made along the path CC of FIG. 8.

Figure 1:
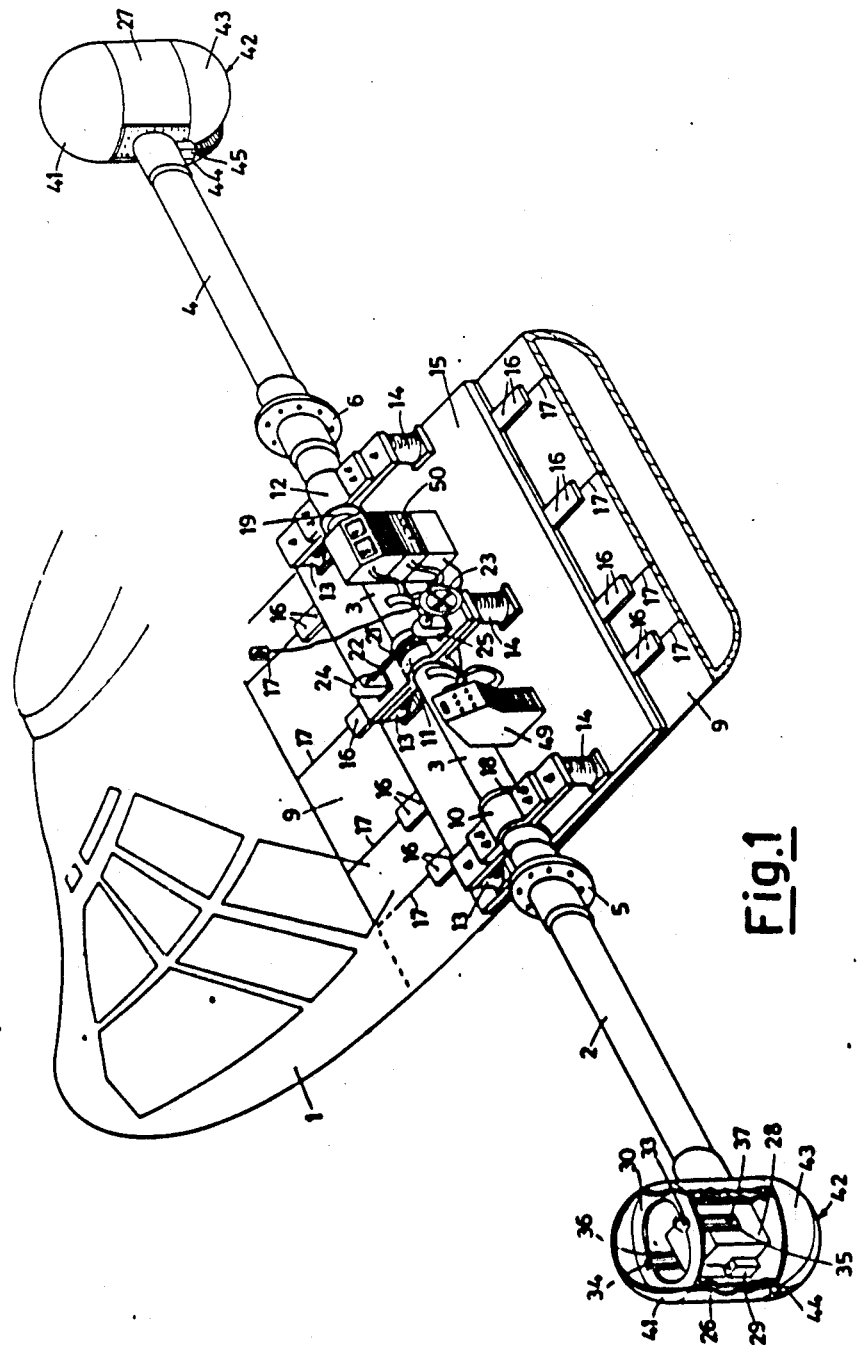
FIG. 1 shows a partly sectional perspective view of a heliborne beam provided according to the invention.

FIGS. from 10a to 10d show the different trims which the beam and consequently the photocameras can be made take according to the invention.

Referring to the figures, with 1 a helicopter is indicated, on board of which the beam being the object of the invention is to be installed, whose length is of the order of 6 m.

Said beam is constituted by three cylindrical tubular sections, respectively 2, 3 and 4, linked to each other in sequence by means of the flanges 5 and 6, and is positioned with its side sections 2 and 4 cantilevering from the two sides of the helicopter perpendicularly to the axis of the same helicopter, passing through mating semicircular ports open in the two wings 7 and 8 of the side doors of helicopter's cabin (see specifically FIG. 10). The centre section 3 of the beam is then rotatably mounted on the floor 9 of the cabin of helicopter 1 by means of three clamp collars, respectively 10, 11 and 12, which support it, and are in their turn supported each by two double-effect cylindrical shock absorbers 13 and 14 (see specifically FIG. 4), of column shape, fastened on opposite sides relatively to the beam's longitudinal axis on a base or bench 15, which is bolted on to said floor 9 by means of nut-bolts 16 fastened on to the same guides 17 usually serving to fasten the seats.

On the centre section 3 also two shoulder washers 18 and 19 are fastened, which cooperate respectively with the clamp collars 10 and 12 to prevent any longitudinal sliding of the beam.

The centre collar 11 is moreover partly slit into two parts to create a circumferential slot 20, through which a rack 21 protrudes (see specifically FIG. 4), fastened on to the outer circumference of the beam's centre section 3. Said rack 21 serves to make the beam rotate by 180° around its longitudinal axis, and to that purpose inmeshes with a worm 22 provided with handwheel 23, and rotatably supported on said centre collar 11 by means of the support blocks 24 and 25.

At the free ends of the two side sections 2 and 4 of the beam, two cylindrical housings, respectively 26 and 27 are solidly fastened, inside each of which a metric photocamera 28, provided with related telecamera 29, is supported in a way cushioned and insensible to the vibrations, through a support cylindrical frame 30 (see FIGS. 1, 7, 9), which is linked to its respective outer housing by means of two superimposed threes of double-effect shock absorbers 31 and 31', positioned in a radial direction, and equally spaced apart from each other by 120° (see specifically FIGS. 7 and 8), as well as by means of three coaxial pairs of shock absorbers, they too of the double-effect type 32, 32' and 32" (see always FIGS. 7 and 8), positioned according to the generatrices of the cylindrical housing 26 or 27, and i.e., perpendicularly to the foregoing, equally spaced apart from each other by 120°, and staggered relatively to the shock absorbers 31 and 31'. Said frame 30 is provided with two inner guides 33 and 34 (see specifically FIG. 1), provided in opposite brackets, respectively 35 and 36, vertically solid with the same frame, inside which the side pins 37 and 38 for supporting the telecamera 28 are inserted. In such a way, the photocamera 28 can be easily slit out from the frame 30 and moreover, to avoid that it may rotate, it is bolted with an extension 39 thereof on to a bracket 40 solid with the frame 30.

Figure 10A:
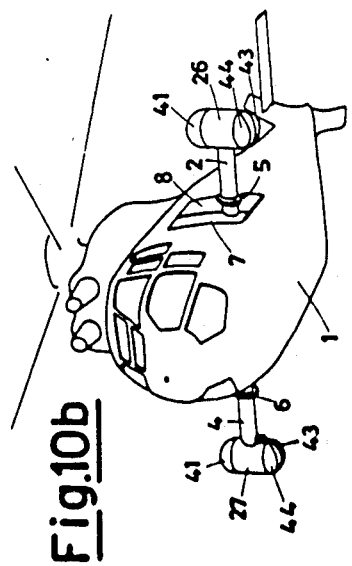
Figure 10B:
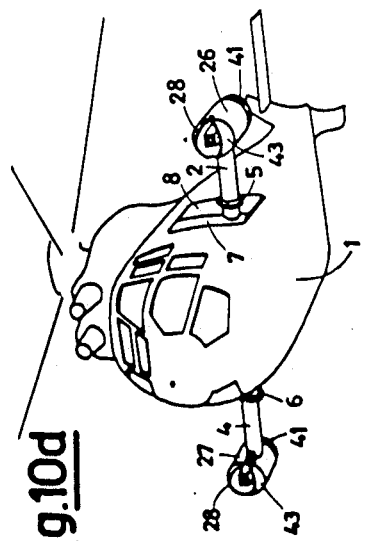

Each cylindrical housing 26 and 27 is then completed, on its side from which the photocamera can be extracted, and i.e. on its side opposite to the objective of the same photocamera, with a stationary aerodynamic closure 41, of hemispherical or ovoidal shape, which is positioned forward as illustrated in FIG. 10a during the transfer flights, as well as on its opposite side with an aerodynamic closure 42, it too of hemispheric or ovoidal shape, partially movable with doors of the "eye-lid" type, respectively 43 and 44, which are actuated by a small electrical motor 45 acting with its pinion 46 on one of the two gear wheels 47 and 48 (see FIG. 6) inmeshing with each other, and respectively fastened on said doors 43 and 44.

Figure 10C:
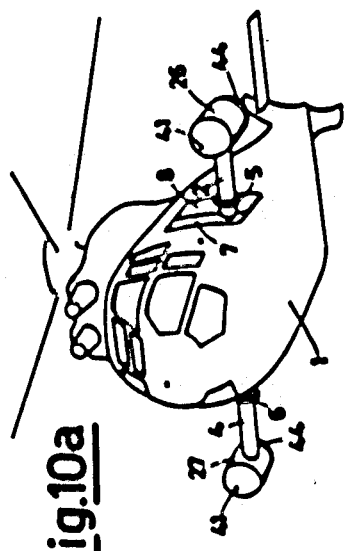
Figure 10D:
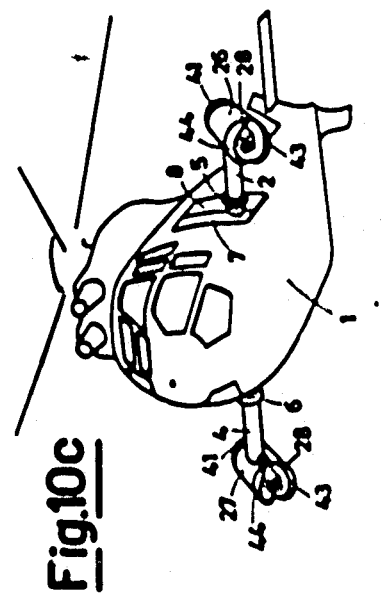

Said doors are open at the time of photographic picture taking only, after that the beam has been rotated into the photographing position as required, which may be either of nadiral or vertical type, with the photocameras being orientated downwards (see FIG. 10b); or of horizontal type with the photocameras aiming forward (see FIG. 10d); or of panoramic type, with the photocameras inclined by any angles (see FIG. 10c).

Finally, on said base or bench 15, and hence inside the cabin of helicopter 1, also the telecontrol devices 49, and the remote-check monitors 50 are installed.

I claim:

1. Heliborne beam, about 6 meters long, for supporting at its two ends two metric photocameras suitable to industrial stereophotogrammetric surveys, said beam being cantilevering from the two sides of a helicopter, perpendicularly to the axis of the same helicopter, characterized in that it is constituted by a cylindrical tubular structure very rigid and of considerable weight, formed by a plurality of sections linked in sequence with each other by means of large-dimension flanges, of which the centre section is rotatably supported by three clamp-collars each supported by two double-effect cylindrical shock absorbers, of column shape, fastened on opposite sides relatively to the longitudinal axis of the same section on a base or bench which is bolted on to the helicopter cabin's floor by means of nut-bolts fastened to the same guides usually used for fastening the seats, the two side collars of the three being in shoulder cooperation with two corresponding shoulder washers fastened on to the said centre section, while the centre collar is partly split into two parts, to create a circumferential slot through which a rack fastened on to the outer circumference of said beam's center section extends, said rack inmeshing with a worm provided with handwheel for the manual turning by 180° of the beam around its own longitudinal axis, which is rotatably supported on said centre collar, means being moreover provided to support the metric photocameras provided with respective telecamera for the aiming check, in a way cushioned and insensible to vibrations, inside cylindrical housings solid with the beam ends, each cylindrical housing being completed by aerodynamic closures of hemispherical or ovoidal shape, of which one is stationary in the portion which is positioned forward during the transfer flight, and one is partly movable with doors of the "eyelid" type, actuated by a small electrical motor acting on two gear wheels inmeshing with each other, and respectively solid with the two door' eyelids, and means being moreover provided for the telecontrol and the remote check of said photocameras, the control devices and the check monitors being installed on said base or bench inside the helicopter's cabin.

2. Heliborne beam according to claim 1, characterized in that the said means for supporting the metric photocameras provided with respective telecamera for the aiming check in a way cushioned and insensible to the vibrations within cylindric housings solid with the beam's ends consist in a cylindrical support frame into two inner guides provided in two opposite brackets of which the photocamera support side pins are inserted, said frame being linked to its respective outer housing by means of two shock absorber units, the first unit being constituted by two superimposed threes of double-effect shock absorbers positioned in radial direction, and equally spaced apart from each other by 120°, whilst the second unit is constituted by three coaxial pairs of shock absorbers, they too of double-effect type, positioned according to the generatrices of the cylindrical frame, and i.e. perpendicularly to the foregoing, equally spaced apart from each other by 120° and staggered relatively to the shock absorbers of the first unit.

3. Heliborne beam according to claim 1, characterized in that the said tubular cylindrical structure is formed by three equal sections linked in sequence.

4. Heliborne beam according to claim 1, characterized in that said beam cantilevers from the two helicopter's sides through matching semicircular ports open in the two swings of the helicopter cabin side doors.

* * * * *